(12) United States Patent
Kadowaki et al.

(10) Patent No.: US 7,852,731 B2
(45) Date of Patent: Dec. 14, 2010

(54) OPTICAL STORAGE MEDIUM AND OPTICAL INFORMATION APPARATUS

(75) Inventors: Shinichi Kadowaki, Hyogo (JP); Kenichi Kasazumi, Osaka (JP); Kazuhisa Yamamoto, Osaka (JP); Tetsuro Mizushima, Osaka (JP); Tomoya Sugita, Osaka (JP)

(73) Assignee: Panasonic Corporation, Osaka (JP)

( * ) Notice: Subject to any disclaimer, the term of this patent is extended or adjusted under 35 U.S.C. 154(b) by 721 days.

(21) Appl. No.: 11/885,416

(22) PCT Filed: Feb. 22, 2006

(86) PCT No.: PCT/JP2006/303158
§ 371 (c)(1), (2), (4) Date: Aug. 31, 2007

(87) PCT Pub. No.: WO2006/092998
PCT Pub. Date: Sep. 8, 2006

(65) Prior Publication Data
US 2009/0303856 A1      Dec. 10, 2009

(30) Foreign Application Priority Data
Mar. 1, 2005   (JP) .............................. 2005-055880

(51) Int. Cl.
*G09B 7/00* (2006.01)
(52) U.S. Cl. ..................... 369/103; 369/275.3
(58) Field of Classification Search .................. 369/103
See application file for complete search history.

(56) References Cited

U.S. PATENT DOCUMENTS 5,892,741 A    4/1999   Kadowaki et al.

| | | |
|---|---|---|
| 2002/0041561 A1* | 4/2002 | Tsukamoto et al. ......... 369/103 |
| 2003/0147328 A1 | 8/2003 | Horimai et al. |
| 2004/0184382 A1* | 9/2004 | Horimai et al. ............. 369/103 |
| 2006/0109774 A1 | 5/2006 | Horimai et al. |

FOREIGN PATENT DOCUMENTS

| | | |
|---|---|---|
| JP | 60-224133 | 11/1985 |
| JP | 2003-228849 | 8/2003 |
| JP | 2003-263749 | 9/2003 |
| JP | 2004-139711 | 5/2004 |
| JP | 2004-171611 | 6/2004 |
| JP | 2004-265472 | 9/2004 |

\* cited by examiner

*Primary Examiner*—Aristotelis Psitos
(74) *Attorney, Agent, or Firm*—Wenderoth, Lind & Ponack, L.L.P.

(57) ABSTRACT

Disclosed is an arrangement that enables to keep a relative positional relation between a beam for servo control and a beam for information recording/reproduction constant concerning focusing control and tracking control, even if the two beams are different from each other. An optical storage medium has a reflection surface for reflecting a first beam having a first wavelength, and reflecting a second beam having a second wavelength different from the first wavelength; and an information storage layer for recording information as an interference pattern by incidence of the first beam, or reproducing the information from a wave surface based on the interference pattern. The reflection surface is formed with plural marks or guide grooves usable in a tracking operation or a focusing operation by irradiation of the second beam. The information storage layer is partially formed, in advance, with a reference interference pattern which is reproduced when the first beam is irradiated, and which is used as a reference for correcting the relative positional relation between the first beam and the second beam.

12 Claims, 7 Drawing Sheets

OPTICAL STORAGE MEDIUM AND OPTICAL INFORMATION APPARATUS

TECHNICAL FIELD

The present invention relates to an optical storage medium for recording information using an interference pattern, and an optical information apparatus for recording, reproducing, or erasing information.

BACKGROUND ART

Advanced technical development has been made with times in the technical field of optical information. The amount of information to be recorded in various optical storage media such as a compact disk (CD), a digital versatile disk (DVD), and a Blu-ray disk has been increasing. A Blu-ray disk having two information recording layers for recording information, with a disk diameter of 12 cm, has a storage capacity as large as 50 gigabytes (GB).

In recent years, development of volume holography has been active to realize optical recording of a larger capacity than the Blu-ray disk. Holographic recording is conducted by superimposing information light and reference light inside an optical storage medium and by writing an interference pattern generated by the superimposing into the optical storage medium. The information recorded in the optical storage medium is reproduced by allowing the reference light to be incident onto the optical storage medium. When the reference light is incident onto the optical storage medium, the interference pattern recorded in the optical storage medium generates diffraction light having information carried by the information light at the time of recording. Volume holography is one of the holographic recording of recording information in a thickness direction of the optical storage medium as well as in planar directions thereof, namely, recording information three-dimensionally. The multiple recording provides an increased recording capacity.

Japanese Unexamined Patent Publication No. 2004-265472 discloses an example of an optical information apparatus for performing the holographic recording. FIG. 7 is a diagram showing a relation between an optical storage medium, and a beam emitted from the optical information apparatus disclosed in the publication according to the prior art.

In the publication, after a red beam 7 emitted from a laser source for servo control is reflected on a mirror 13, the reflected red beam is transmitted through an objective lens 12. The red beam 7 through the objective lens 12 is converted into a convergent beam, and the convergent beam is incident onto a light incoming/outgoing plane "A" of an optical information recording medium 101. Then, the red beam 7 incident onto the optical information recording medium 101 is transmitted through a base member 5, a hologram recording layer 4, and a red transmission filter layer 6, and is focused on a reflection layer 2. The reflection layer 2 is formed on a base member 1 with pits capable of detecting a servo signal. The red beam 7 reflected on the reflection layer 2 is transmitted through the red transmission filter layer 6, the hologram recording layer 4, and the base member 5 again, and goes out of the incoming/outgoing plane "A". The outgoing red beam is, then, transmitted through the objective lens 12, and is reflected on the mirror 13 by 100%. Thus, servo information is detected by an unillustrated servo information detector. The detected servo information is used for focus servo control, tracking servo control, slide servo control, and the like. The hologram material constituting the hologram recording layer 4 is a material free of photosensitivity to red light so that the incidence of the red beam 7 for servo control does not influence the hologram recording layer 4.

Likewise, information light and reference light for recording that have been generated from a green or a blue beam 8 emitted from a laser source for recording/reproduction are transmitted through the mirror 13. Then, the information light and the reference light through the objective lens 12 are irradiated onto the optical information recording medium 101 so that an interference pattern is generated inside the hologram recording layer 4. Information is recorded as the interference pattern in the hologram recording layer 4.

In reproducing the information recorded in the optical storage medium 101, the reference light is irradiated onto the optical storage medium 101 through the objective lens 12. The irradiation of the reference light onto the optical storage medium 101 generates diffraction light containing the information carried by the information light at the time of information recording from the hologram recording layer 4. Allowing the diffraction light to be detected by an image sensor 14 reproduces the information recorded in the optical storage medium 101.

As disclosed in the publication, however, in the case where the beam for servo control, and the beam for information recording/reproduction are different, there is no guarantee that a relative positional relation between the beam for servo control and the beam for information recording/reproduction is kept constant concerning focusing control and tracking control. Therefore, there is room for technical improvement in securing compatibility among different optical information apparatuses, or securing reliability including a measure against aging deterioration even in identical optical information apparatuses.

DISCLOSURE OF THE INVENTION

In view of the problems residing in the prior art, it is an object of the invention to provide an optical storage medium and an optical information apparatus that enable to keep a relative positional relation between a beam for servo control and a beam for information recording/reproduction constant concerning focusing control and tracking control, even if the beam for servo control and the beam for information recording/reproduction are different.

An optical storage medium according to an aspect of the invention comprises: a reflection surface for reflecting a first beam having a first wavelength, and reflecting a second beam having a second wavelength different from the first wavelength; and an information storage layer for recording information as an interference pattern by incidence of the first beam, or reproducing the information from a wave surface based on the interference pattern, wherein the reflection surface is formed with a plurality of marks or guide grooves usable in a tracking operation or a focusing operation by irradiation of the second beam; and the information storage layer is partially formed, in advance, with a reference interference pattern which is reproduced when the first beam is irradiated, and which is used as a reference for correcting a relative positional relation between the first beam and the second beam.

An optical information apparatus according to another aspect of the invention comprises: a first light source for emitting a first beam having a first wavelength; a second light source for emitting a second beam having a second wavelength different from the first wavelength; a condensing optical system for converging the first beam and the second beam to irradiate the first beam and the second beam onto an optical storage medium; a first photodetector for receiving the first beam which is reflected and diffracted on the optical storage medium to output a signal commensurate with an amount of the first beam received thereon; a first signal processor for performing a computation in response to receiving the signal from the first photodetector to acquire information recorded in an information storage layer of the optical storage medium; a second photodetector for receiving the second beam which is reflected and diffracted on the optical storage medium to output a signal commensurate with an amount of the second beam received thereon; a second signal processor for performing a computation in response to receiving the signal from the second photodetector to generate a tracking control signal; and a driver for performing a tracking operation in response to receiving the tracking control signal generated by the second signal processor. The optical storage medium comprises: a reflection surface for reflecting the first beam, and reflecting the second beam; and the information storage layer for recording information as an interference pattern by incidence of the first beam, or reproducing the information from a wave surface based on the interference pattern. The reflection surface is formed with a plurality of marks or guide grooves usable in the tracking operation by irradiation of the second beam, and the information storage layer is partially formed, in advance, with a reference interference pattern which is reproduced when the first beam is irradiated, and which is used as a reference for correcting a relative positional relation between the first beam and the second beam. The second signal processor changes the tracking control signal so as to correct a position for tracking control to an intended position in response to receiving a signal from the first signal processor when the first beam is irradiated onto the reference interference pattern.

According to the above arrangements, even if the first beam for information recording/reproduction, and the second beam for servo control are emitted from the different light sources, the position for focusing control and the position for tracking control can be corrected to their respective intended positions based on the information obtained from the reference interference pattern used as the reference for correcting the relative positional relation between the first beam and the second beam. Also, the arrangements enable to keep the relative positional relation between the first beam and the second beam constant concerning the focusing control and the tracking control, thereby securing compatibility among different optical information apparatuses. Furthermore, since the arrangements are free from a drawback such as apparatus degradation resulting from aging deterioration, the arrangements enable to secure sufficient reliability even in identical optical information apparatuses.

These and other objects, features and advantages of the present invention will become more apparent upon reading of the following detailed description along with the accompanying drawings.

BEST MODE FOR CARRYING OUT THE INVENTION

In the following, embodiments of an optical storage medium and an optical information apparatus according to the invention are described referring to the accompanying drawings. Throughout the drawings, like numerals or symbols represent elements, arrangements or operations identical to each other.

First Embodiment

Figure 1A:
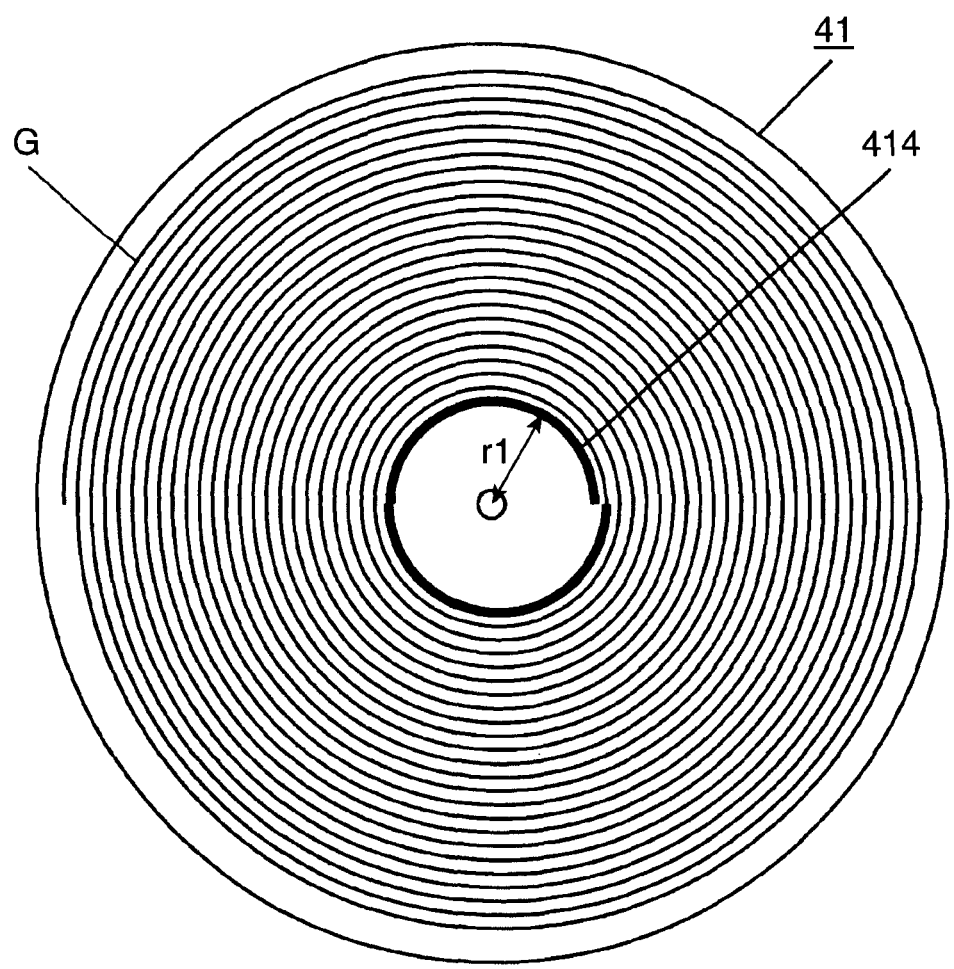
FIG. 1A is a diagram schematically showing an arrangement of an optical storage medium in a first embodiment of the invention.
Figure 1B:
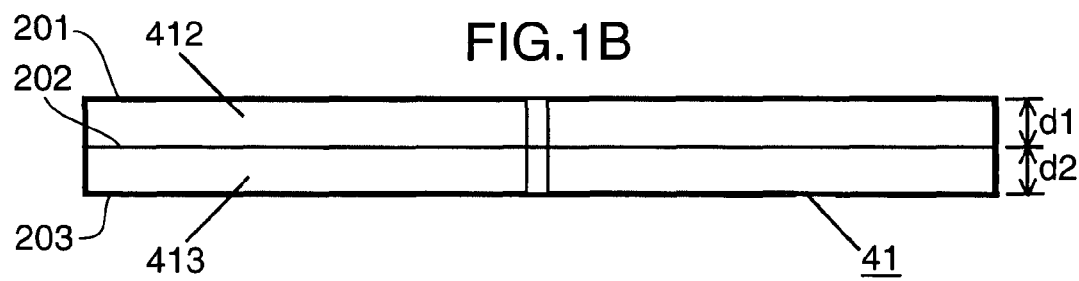
FIG. 1B is a diagram schematically showing a cross-section of the optical storage medium in the first embodiment.

FIG. 1A is a diagram schematically showing an arrangement of an optical storage medium 41. FIG. 1B is a diagram schematically showing a cross-section of the optical storage medium 41. The optical storage medium 41 includes an information storage layer 412 made of a photosensitive resin material, and a base member 413. The photosensitive resin material is a photopolymer utilizing a light curing monomer resin. Various resin materials such as radical monomers and cationic monomers are usable.

The information storage layer 412 has a physical thickness "d1" of 0.6 mm, and the base member 413 has a physical thickness "d2" of 0.6 mm. The optical storage medium 41 has a disk-shaped outer contour, with a diameter of 120 mm. The optical storage medium 41 is spirally formed with a guide groove "G" capable of detecting a tracking error signal. The guide groove "G" serves as tracks in tracking control. Each track has a pitch of about 1 μm. The guide groove "G" is formed in the base member 413. A reflection film i.e. a reflection layer for reflecting light incident onto the optical storage medium 41 is formed on the base member 413. An upper surface of the reflection film corresponds to a surface 202. The guide groove "G" has an optical depth substantially equal to $\lambda 1/2$ regarding light of a wavelength $\lambda 1=532$ nm. In other words, diffraction light is not generated from the groove regarding the light of the wavelength $\lambda 1=532$ nm, and the surface 202 simply functions as a reflection mirror.

The reflection film is formed by vapor deposition of aluminum onto the base member 413. The reflection film also serves as a member for blocking unnecessary light so that the information storage layer 412 may not be photosensitized even if the unnecessary light is incident through a surface 203. A beam irradiated from the optical information apparatus is incident from a surface 201. Although not illustrated in FIG. 1B, a wavelength selective reflection film for reflecting light of a wavelength different from the wavelength of the beam irradiated from the optical information apparatus may be formed on the surface 201. Forming the wavelength selective reflection film enables to prevent the information storage layer 412 from being photosensitized by unnecessary light.

The photosensitive resin material forming the information storage layer 412 is a monomer resin having a light absorption band in a specific wavelength band. The photosensitive resin material has the following property. Irradiation of light of a wavelength in the light absorption band causes polymerization of the monomer resin. When the incident light generates an interference pattern in the information storage layer 412, the interference pattern is recorded in the information storage layer 412. When the accumulated amount of the incident light reaches a predetermined amount, the monomer resin in the incident area is used up by the polymerization, with the result that no more information recording is enabled in the area.

In the first embodiment, the reflection surface 202 of the optical storage medium 41 reflects a first beam having a first wavelength $\lambda 1$, and reflects a second beam having a second wavelength $\lambda 2$ different from the first wavelength $\lambda 1$. The information storage layer 412 of the optical storage medium 41 records information as an interference pattern by incidence of the first beam, or reproduces information from a wave surface based on the interference pattern. The guide groove "G" usable in a tracking operation or a focusing operation by irradiation of the second beam is formed in the reflection surface 202.

A reference interference pattern 414, which is an interference pattern used as a reference for correcting a relative positional relation between the first beam of the wavelength $\lambda 1$ and the second beam of the wavelength $\lambda 2$, is partially formed in advance on an internal circumferential portion of the optical storage medium 41, specifically, in this embodiment, at a position away from the center of the optical storage medium 41 by a radius "r1". Specifically, the reference pattern 414 is formed in plural number substantially along the tracks. The reference interference patterns 414 may be formed by a two-beam interference system, or may be formed as a computer-synthesized hologram. Physically forming the reference interference patterns by the computer-synthesized hologram, in place of optically forming the reference interference patterns, is advantageous in eliminating a recording error resulting from the performance of an apparatus for recording the reference interference patterns, and in enhancing compatibility among different optical information apparatuses.

The reference interference patterns 414 are adapted to judge whether the beam for information recording or reproduction is irradiated onto an intended focusing position or an intended tracking position while the optical information apparatus performs a focusing control or a tracking control, and to correct a focusing control signal or a tracking control signal according to needs. The reference interference patterns 414 are partially formed on a recording surface of the optical storage medium 41, instead of the entirety of the recording surface thereof.

The optical storage medium 41 is used in a rotated state in the optical information apparatus. In view of this, forming the respective reference interference patterns 414 substantially at identical radial positions enables to sequentially perform error detection necessary for correcting a focusing control signal or a tracking control signal. This arrangement enables to provide an optical information apparatus with a shortened learning time, in other words, an optical information apparatus with a less waiting time and a less stress for users. There is no specific constraint regarding the learning time. As long as a certain waiting time by rotation of the optical storage medium 41 is allowable, the number of the reference interference patterns 414 may be reduced, e.g. to one. In the altered arrangement, information can be stored in an area other than the area where the reference interference patterns is formed, which enables to increase the amount of information recordable in the optical storage medium 41.

It should be noted that, as shown in FIG. 1, in the case where the guide groove "G" i.e. the tracks are spirally formed, each track along a full circumference of 360 degrees can be regarded as the identical radial positions, without considering a displacement corresponding to a track pitch.

Further alternatively, the reference interference patterns 414 may be discretely formed, in place of sequentially formed. Discretely forming the reference interference patterns 414 also enables to increase the amount of information recordable in the optical storage medium 41. The well known techniques of controlling an apparatus to perform a tracking operation to an intended tracking position by reading the reference interference patterns 414 are usable in the embodiment.

Although not described herein, it is possible to record track-related information, signals for generating clocks, address-related information, or the like by wobbling the guide groove "G". The tracks may be formed in the form of pit arrays having a certain depth, in place of the groove, or may be formed by discretely arranging mark pairs having different densities. There is no constraint regarding the track configuration, and the manner of recording track-related information, and the like. Various methods that have been invented in the course of developing the conventional optical disk devices such as digital versatile disks and Blu-ray disks are applicable.

As mentioned above, the reflection surface 202 of the optical storage medium 41 reflects the first beam having the first wavelength $\lambda 1$, and the second beam having the second wavelength $\lambda 2$ different from the first wavelength $\lambda 1$. The information storage layer 412 of the optical storage medium 41 records information as an interference pattern by incidence of the first beam, or reproduces the information from the wave surface based on the interference pattern. The reflection surface 202 is formed with plural marks or the guide groove "G" usable in a tracking operation or a focusing operation by irradiation of the second beam. The information storage layer 412 is formed, in advance, with the reference interference patterns 414 which are reproduced by irradiation of the first beam and which are used as a reference for correcting a relative positional relation between the first beam and the second beam.

With the above arrangement, even if the first beam for information recording/reproduction, and the second beam for servo control are emitted from the different light sources, the position for focusing control or the position for tracking control can be corrected to its intended position based on the information obtained from the reference interference patterns 414, which are used as a reference for correcting the relative positional relation between the first beam and the second beam. Also, the above arrangement enables to keep the relative positional relation between the first beam and the second beam constant concerning focusing control and tracking control, whereby compatibility among different optical information apparatuses can be secured. Also, the arrangement is advantageous in securing sufficient reliability even in identical optical information apparatuses, because the arrangement is free from a drawback such as apparatus degradation resulting from aging deterioration.

Second Embodiment

Figure 2:
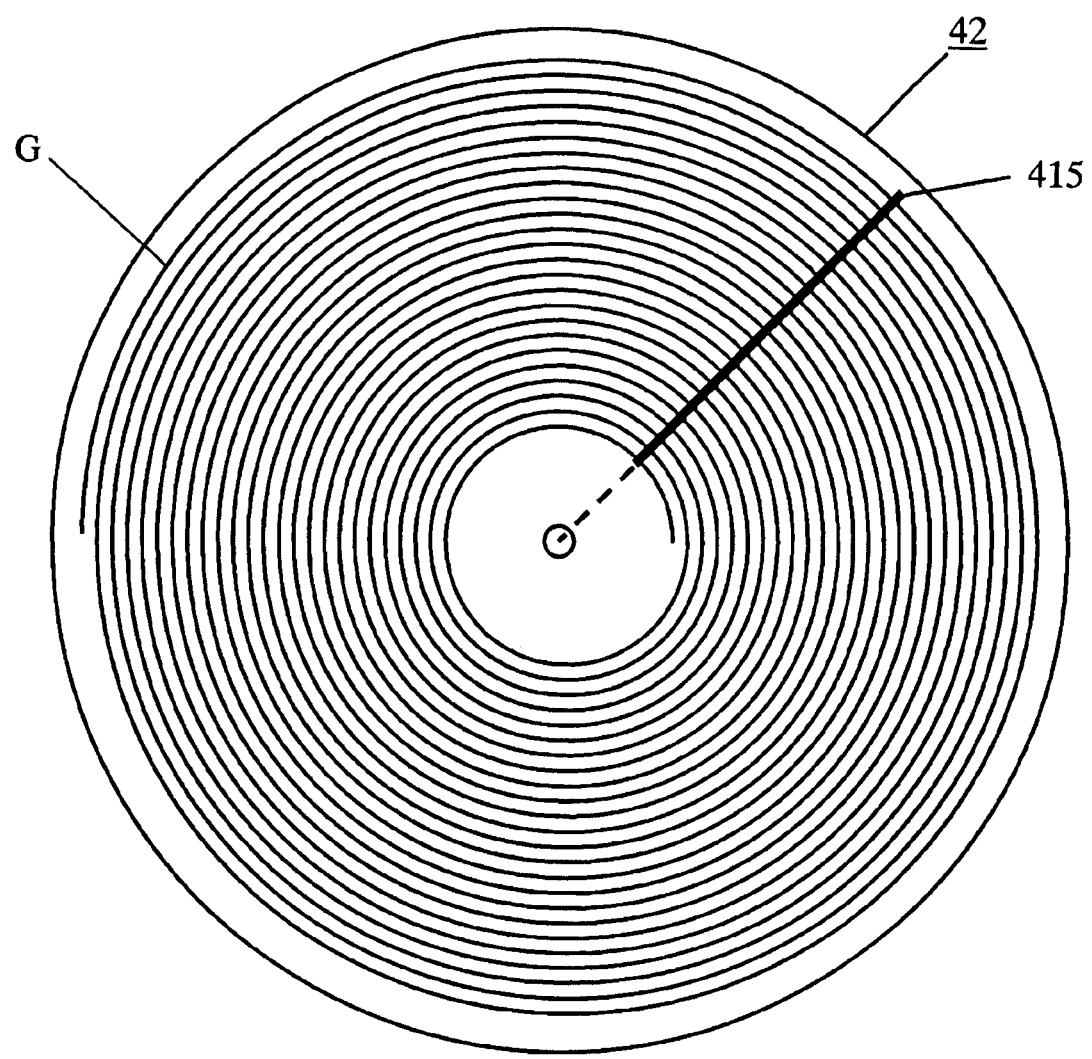
FIG. 2 is a diagram schematically showing an arrangement of an optical storage medium in a second embodiment of the invention.

FIG. 2 is a diagram schematically showing an arrangement of an optical storage medium 42 in another embodiment of the invention. Although not illustrated, the basic arrangement of the optical storage medium 42 in the second embodiment is substantially the same as that of the optical storage medium 41 shown in the first embodiment.

The optical storage medium 42 is different from the optical storage medium 41 in the position where a reference interference pattern is formed on the optical storage medium. Whereas the reference interference patterns 414 are formed at the positions away from the center of the optical storage medium 41 by the radius "r1", the reference interference patterns 415 each extends radially from the center of the optical storage medium 42. Specifically, in the second embodiment, the reference interference patterns 415 are formed linearly and radially outwardly from the center of the optical storage medium 42. Generally, the thickness, the warp, or the like of an information recording layer of the disk-shaped optical storage medium 42 is greatly varied depending on the radial positions thereof. Forming the reference interference patterns 415 radially outwardly from the center of the optical storage medium 42 enables to perform an error detection necessary for correcting a focusing control signal or a tracking control signal at any of the intended radial positions, because the reference interference patterns 415 are formed at the intended radial positions. This arrangement enables to enhance learning precision, and to provide an optical storage medium with high reliability.

Figure 3A:
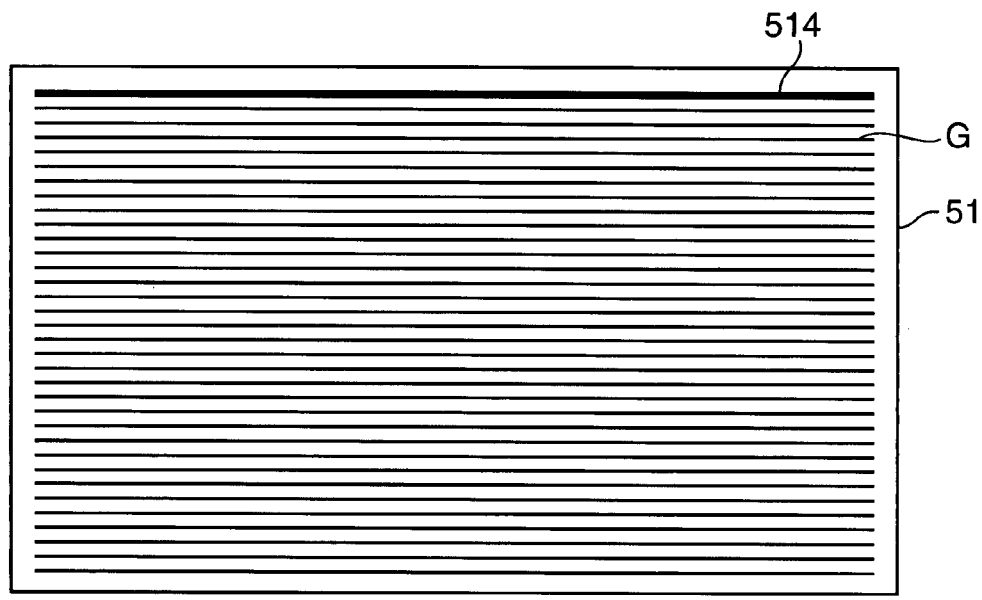
FIGS. 3A and 3B are diagrams each schematically showing a rectangular optical storage medium.
Figure 3B:
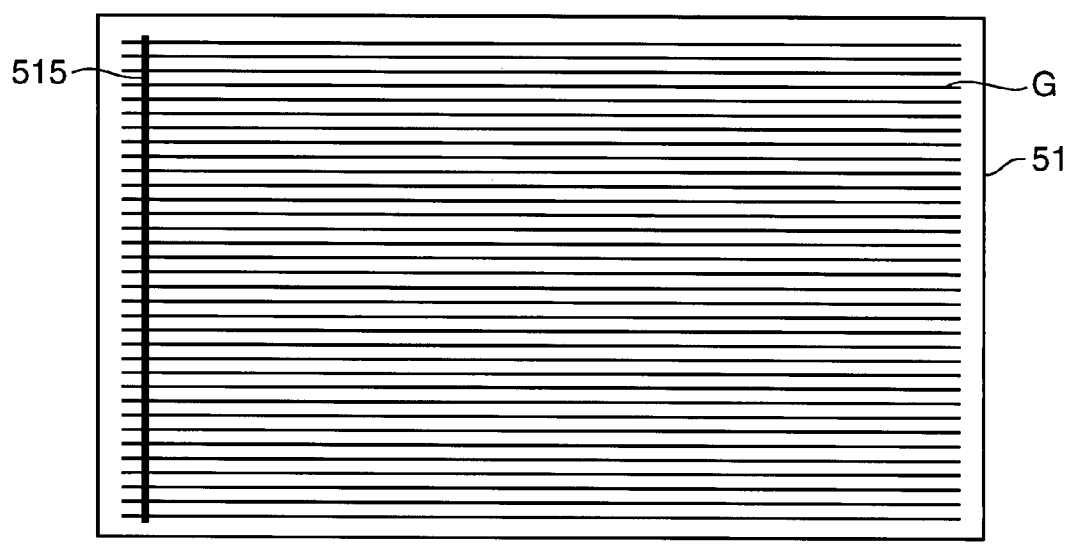

The shape of the optical storage medium 41, 42 is not limited to the disk-like shape, but may be a rectangular shape e.g. a card-like shape. FIGS. 3A and 3B are diagrams each schematically showing a rectangular optical storage medium. FIG. 3A schematically shows an arrangement of the optical storage medium, in which reference interference patterns and guide grooves are formed substantially parallel to each other. FIG. 3B schematically shows an arrangement of the optical storage medium, in which reference interference patterns and guide grooves are formed substantially perpendicular to each other.

As shown in FIG. 3A, the rectangular optical storage medium 51 has the plural guide grooves "G" parallel to the longer side of the optical storage medium 51. The reference interference patterns 514 are formed along one of the guide grooves "G". In FIG. 3A, the reference interference patterns 514 are formed sequentially and in parallel to the one guide groove "G". Alternatively, the reference interference patterns 514 may be formed discretely and in parallel to the one guide groove "G".

In FIG. 3A, the reference interference patterns 514 are formed along the uppermost guide groove "G" of the plural guide grooves "G". Alternatively, the reference interference patterns 514 may be formed along any one of the guide grooves "G". In the altered arrangement, the optical storage medium 51 has a rectangular shape, the guide grooves "G" are formed substantially parallel to the longer side of the optical storage medium 51, and the reference interference patterns 514 are formed substantially parallel to the guide grooves "G".

Further alternatively, as shown in FIG. 3B, the reference interference patterns 515 may be formed sequentially and in perpendicular to the guide grooves "G". In the altered arrangement, the optical storage medium 51 has a rectangular shape, the guide grooves "G" are formed substantially parallel to a longer side of the optical storage medium 51, and the reference interference patterns 515 are formed substantially perpendicular to the guide grooves "G".

In the arrangements shown in FIGS. 3A and 3B, the guide grooves "G" are formed parallel to the longer side of the optical storage medium 51. Alternatively, the guide grooves "G" may be formed parallel to the shorter side of the optical storage medium 51. Further alternatively, plural pits or plural marks may be formed in place of the guide grooves "G".

Generally, the thickness, the warp, or the like of an information recording layer of a rectangular optical storage medium is likely to be varied in a direction parallel to the longer side or the shorter side of the rectangular optical storage medium. Therefore, forming the tracks i.e. the guide grooves "G" and the reference interference patterns substantially parallel or perpendicular to the longer side or the shorter side of the rectangular optical storage medium enables to enhance learning precision and to provide an optical storage medium with high reliability, as in the case of the first embodiment.

Various approaches such as speckle multiplexing, shift multiplexing using a spherical wave, and angular multiplexing can be applied to the optical information apparatus. Further, it is possible to record information in an optical storage medium with high compatibility among different optical information apparatuses by forming the reference interference patterns in advance at the time of shipment of the optical storage medium.

Further alternatively, predefining the recording positions, addresses, or the like of interference patterns to be used as the reference interference patterns enables to eliminate forming the reference interference patterns in advance at the time of shipment of the optical storage medium. In the altered arrangement, the reference interference patterns are recorded at intended positions, using an optical information apparatus of recording information for the first time. Since the recording condition of the reference interference patterns is greatly affected by the performance of the optical information apparatus of recording information for the first time, reliability of the reference interference patterns is slightly degraded, as compared with the optical storage medium 41. However, the altered arrangement enables to provide a more inexpensive optical storage medium, because there is no need of forming the reference interference patterns in advance at the time of shipment.

In the above altered arrangement, when the reference interference patterns are recorded by the optical information apparatus of recording information for the first time, the apparatus not only records the reference interference patterns but also performs a recording processing of using up the remaining monomer resin material so as to prevent further recording on the area where the reference interference patterns have been recorded. This arrangement enables to prevent likelihood that an optical information apparatus other than the first-time-used apparatus may attempt to record information in the area where the reference interference patterns have been formed, which may degrade the reference interference patterns. Thus, the arrangement enables to secure stable formation of reference interference patterns, and to enhance compatibility among different optical information apparatuses.

Third Embodiment

Figure 4:
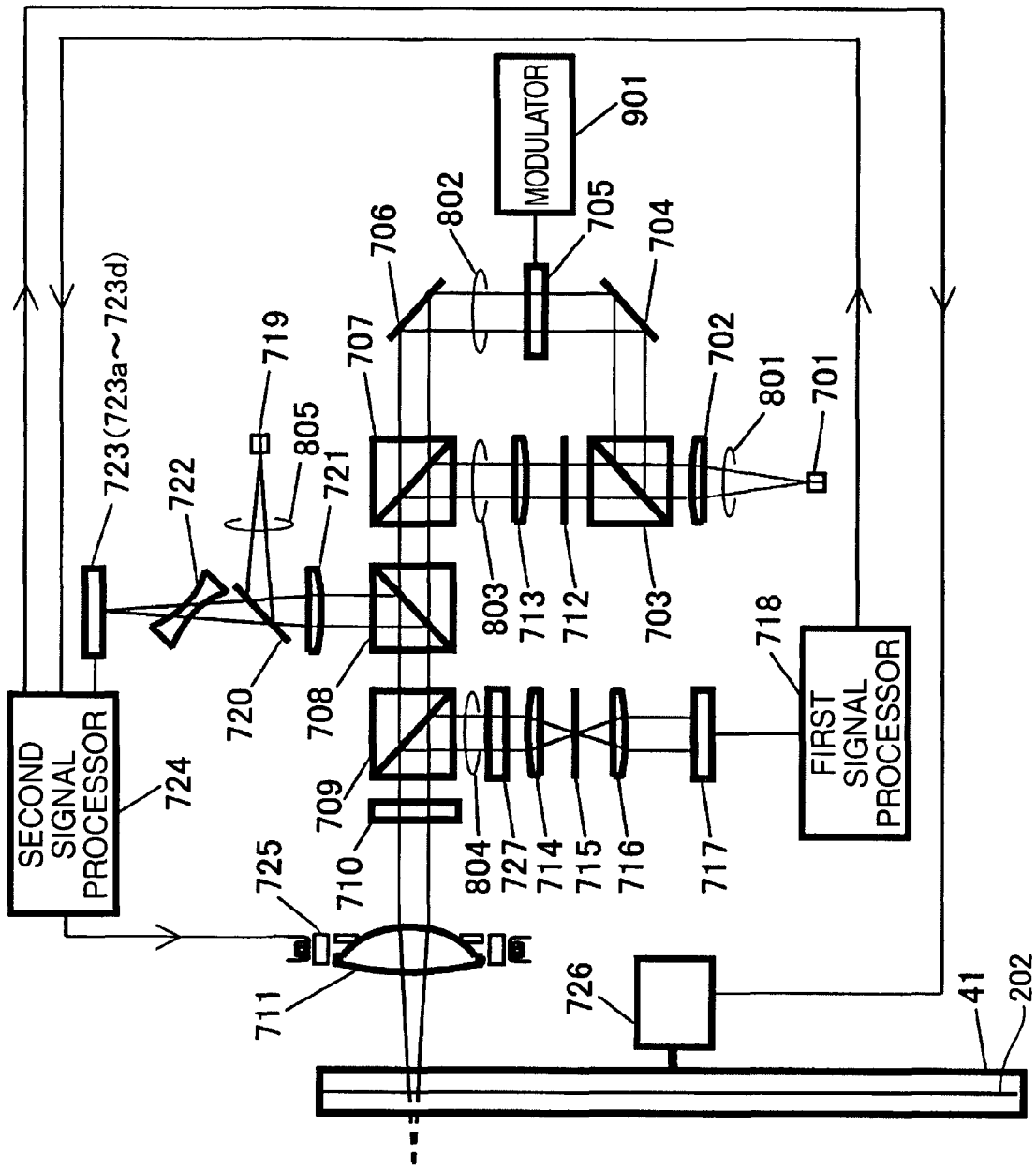
FIG. 4 is a diagram showing an arrangement of an optical information apparatus in a third embodiment of the invention.

FIG. 4 is a diagram schematically showing an arrangement of an example of an optical information apparatus embodying the invention. The optical information apparatus includes a first light source 701 and a second light source 719. The first light source 701 has a solid laser using Nd:YAG crystal, and a nonlinear device composed of lithium niobate. The first light source 701 is operated in such a manner that incidence of a beam of a wavelength of 1,064 nm emitted from the solid laser onto the lithium niobate crystal with a waveguide channel for quasi phase matching generates a second harmonic wave, thereby obtaining a beam of a wavelength of 532 nm.

The first light source 701 emits a linear polarized divergent beam 801 of a wavelength $\lambda 1=532$ nm, as a first beam. The beam 801 is collimated into collimated beams through a lens 702. After the collimation, the beam 801 is split into two beams 802 and 803 by a beam splitter 703. The beam 802 reflected on the beam splitter 703 is reflected on a mirror 704, has its optical path bent on the mirror 704, and then, is incident onto a spatial modulation device 705. A modulator 901 outputs a control signal for controlling the spatial modulation device 705 based on information to be recorded. The spatial modulation device 705 modulates a wave surface of the beam 802 incident thereon based on the control signal outputted from the modulator 901. The modulated beam 802 is transformed into signal light i.e. information light, which is used in recording information in an optical storage medium 41 by a two-beam interference system.

The beam 802 modulated by the spatial modulation device 705 is reflected on a mirror 706, has its optical path bent on the mirror 706, and then, is transmitted through a beam splitter 707. On the other hand, the beam 803 that has been transmitted through the beam splitter 703 is transmitted through an aperture 712 having an annular opening. The beam through a lens 713 is converted into a slightly converged beam, so that the converged beam serves as reference light used in recording information in the optical storage medium 41 by the two-beam interference system, or in reproducing the information recorded in the optical storage medium 41 by the two-beam interference system. Then, the beam 803 that has been transmitted through the lens 713 is reflected on the beam splitter 707, and propagates along an optical path coaxially with the beam 802. In this arrangement, the beams and 803 have different focal positions from each other.

The coaxially propagated beam 802, 803 through the beam splitter 707 is transmitted through a dichroic mirror 708 and a polarization beam splitter 709, and then, transmitted through a ¼-wavelength plate 701, and converted into a circular polarized beam. The dichroic mirror 708 is designed to transmit all the light components of the wavelength $\lambda 1=532$ nm and to reflect all the light components of the wavelength $\lambda 2=650$ nm. The beam 802, 803 that has been transmitted through the ¼-wavelength plate 710 is condensed on a lens while being directed toward the optical storage medium 41. Thus, an interference pattern by the two-beam interference system is formed in an information storage layer 412 of the optical storage medium 41 for information recording.

In reproducing the information recorded in the optical storage medium 41, the optical information apparatus is operated to irradiate the beam 803 as reference light onto the optical storage medium, while suspending irradiation of the beam 802 as signal light onto the optical storage medium. In this arrangement, the modulator 901 outputs a control signal for controlling the spatial modulation device 705 to suspend transmission of the beam 802 therethrough. As a result of the control, the spatial modulation device 705 blocks the incident beam 802 from being transmitted therethrough based on the control signal outputted from the modulator 901. When the beam 803 is irradiated onto the optical storage medium 41, a beam 804, which is diffraction light of a circular polarized beam containing the recorded information, is generated based on the interference pattern formed on the information storage layer 412.

The beam 804 is reflected on a surface 202. However, since the surface 202 is formed with a groove having an optical depth of $\lambda 1/2$, diffraction light which may cause unnecessary noise resulting from the groove is not generated. In this embodiment, the groove has the optical depth of $\lambda 1/2$. Alternatively, the groove may have an optical depth other than the above, according to needs, in view of a fact that a groove with an optical depth of a positive integer multiplication of $\lambda 1/2$ is free from generation of unnecessary diffraction light, as in the case of the above arrangement. After the reflection on the surface 202, and transmission through the lens 711, the beam 804 is transmitted through the ¼-wavelength plate 710, and converted into a linear polarized beam. After the transmission through the ¼-wavelength plate 710, the beam 804 is reflected on the polarization beam splitter 709, and then is transmitted through a filter 727 having wavelength selectivity. The filter 727 is adapted to reduce light components of a wavelength other than the wavelength of 532 nm, thereby removing unnecessary light as noise.

Primary components of the unnecessary light are part of light components corresponding to a beam 805 of the wavelength 650 nm, which is used in irradiation for servo operation. In designing configuration, the beam splitter 709 is designed to transmit all the light components of the beam 805. However, due to double refraction of the optical storage medium 41, or variations in optical components constituting the optical information apparatus, or a like factor, part of the light components corresponding to the beam 805 may be reflected on the beam splitter 709. Consequently, unless the filter 727 be provided to block light of a wavelength other than the wavelength of 532 nm, the S/N ratio in detecting the beam 804 may be lowered.

After the removal of the unnecessary light of the wavelength other than the wavelength 532 nm by transmission through the filter 727, the beam 804 is converted into a convergent beam through a lens 714, and the converged beam is transmitted through an aperture 715 as a spatial filter for removal of unnecessary diffused light or stray light as noise. After the transmission through the aperture 715, the beam 804 is transmitted through a lens 716, and then, is received by a first photodetector 717. The first photodetector 717 is an image sensor, e.g., a charge coupled device (hereinafter, called as "CCD") in this embodiment. Alternatively, a MOS image sensor, or various light receiving devices such as a photodetector comprised of simple PN-junction may be used. A signal outputted from the first photodetector 717 is sent to a first signal processor 718 for demodulation of the information recorded in the optical storage medium 41.

On the other hand, the second light source 719 is a semiconductor laser, as in the case of the first light source 701. The second light source 719 emits the linear polarized divergent beam 805 of the wavelength $\lambda 2=650$ nm, as a second beam. After the beam 805 emitted from the second light source 719 is reflected on a half mirror 720, and has its optical path bent on the half mirror 720, the beam 805 is incident onto a lens 721, and is collimated into substantially collimated beams. After the beam 805 through the lens 721 is reflected on the dichroic mirror 708, and has its optical path bent on the dichroic mirror 708, the beam 805 is transmitted through the polarization beam splitter 709 and the ¼-wavelength plate 710, and converted into a circular polarized beam. The beam 805 that has been transmitted through the ¼-wavelength plate 710 is condensed on the lens 711 so that the beam is focused on the surface 202 of the optical storage medium 41. After the beam 805 is reflected on the surface 202, and transmitted through the lens 711, the ¼-wavelength plate 710, and the polarization beam splitter 709, the beam 805 is reflected on the dichroic mirror 708, and has its optical path bent thereat.

Then, after transmission through the lens 721, the beam 805 is transmitted through the half mirror 720 where astigmatic aberration is performed. The beam 805 that has been transmitted through the half mirror 720 has its coma aberration corrected by transmission through a concave lens 722 having a tilted optical axis to be received by a second photodetector 723. The coma aberration is performed together with the astigmatic aberration while the beam 805 is transmitted through the half mirror 720.

The second photodetector 723 includes four light receiving portions 723a, 723b, 723c, and 723d, each of which outputs a current signal commensurate with the amount of light received thereon. The signals outputted from the second photodetector 723 are outputted to a second signal processor 724, which, in turn, generates a focusing error signal and a tracking error signal, using the signals outputted from the second photodetector 723. A focusing error signal used in focusing control is obtained by an astigmatic aberration method, and a tracking error signal used in tracking control is obtained by a push-pull method, respectively. Since both of the astigmatic aberration method and the push-pull method are generally well known methods, detailed description on a computation approach or the like concerning the methods is omitted herein.

The second signal processor 724 generates the focusing control signal for executing focusing control and the tracking control signal for executing tracking control by performing amplification, phase compensation, offset correction, and the like for the focusing error signal and the tracking error signal. The focusing control signal and the tracking control signal are outputted to a driver 725 for focusing control and tracking control.

The optical information apparatus having the above configuration is operated as follows. Upon lapse of a certain duration immediately after the power source of the apparatus is turned on, or in response to loading an optical storage medium, or as timed with changeover from a reproduction operation to a recording operation, or a like operation, the apparatus is operative to reproduce the information from the optical storage medium based on the reference interference patterns formed on the optical storage medium 41. When the recorded information is reproduced by irradiation of the beam 803 onto the reference interference patterns, the first signal processor 718 outputs, to the second signal processor 724, a signal "S" depending on the intensity of the signal outputted from the first photodetector 717. The second signal processor 724 changes the focusing control signal and the tracking control signal in such a manner as to maximize the signal-to-noise ratio (S/N ratio) of the signal "s". The focusing control signal is changed by changing a gain of two signals outputted to a differential calculator in generating the focusing error signal. Alternatively, an offset signal may be electrically applied to the focusing control signal to simplify the operation. The tracking control signal is changed in a similar manner as changing the focusing control signal.

The focusing control position and the tracking control position are corrected to their respective intended positions based on information obtained based on the reference interference patterns, which are used as a reference for correcting the relative positional relation between the first beam of the wavelength $\lambda 1$, and the second beam of the wavelength $\lambda 2$. This arrangement enables to realize an optical information apparatus with enhanced compatibility among different optical information apparatuses in information recording and reproduction. Also, the arrangement provides an information recordable and reproducible optical information apparatus with high reliability even in identical optical information apparatuses, despite aging deterioration concerning recording/reproducing characteristics.

Alternatively, the focusing control signal and the tracking control signal may be changed so as to maximize the signal to be outputted from the first photodetector 717, or to maximize the diffraction performance of the optical storage medium. In the altered arrangement, since optimization processing can be conducted without noise detection, the arrangement enables to provide an optical information apparatus capable of attaining an optimized condition in a shortened period, and with a less waiting time.

There is no constraint regarding the focusing error signal detection method and the tracking error signal detection method in the optical information apparatus. Various methods such as a spot-size detection method, a Foucault method, and a critical angle method are applicable to detect the focusing error signal. Also, various methods such as a three-beam method, a differential push-pull method, and an advanced push-pull method are applicable to detect the tracking error signal. For instance, in case of using three beams in the tracking error signal detection device as disclosed in U.S. Pat. No. 5,892,741, the arrangement of the embodiment can be realized by providing a diffraction grating between the light source 719 and the half mirror 720.

The invention is not limited to the focusing control and the tracking control. Although not described herein, the optical information apparatus is capable of attaining an optimal operative condition by applying various methods concerning tilt control, in the similar manner as mentioned above.

In the holographic recording of performing multiple recording, multiple recording, particularly, shift multiple recording can be stably carried out by setting the pitch of the guide groove "G" for detecting a tracking control signal wider than the pitch of recording a hologram, and by applying the phase changeable tracking control using the tracking error signal, as disclosed in U.S. Pat. No. 5,892,741. In this arrangement, a desirable tracking control signal can be obtained from a guide groove "G" with a coarse pitch by controlling the spot size of the beam 805 for detecting the focusing control signal and the tracking control signal, and by controlling the effective numerical aperture of the beam 805 to be condensed on the optical storage medium 41 through the lens 711. The effective numerical aperture of the beam 805 can be controlled by e.g. providing an aperture between the light source 719 and the half mirror 720.

The driver 726 is a spindle motor for rotating the optical storage medium 41. The optical storage medium 41 is designed in such a manner that the guide groove "G" is wobbled so as to generate a clock signal. The second signal processor 724 generates a control signal for controlling the rotational speed of the driver 726, using a high frequency component of a signal detected by the push-pull method for output to the driver 726, thereby controlling the rotational speed of the driver 726.

In this way, the first light source 701 emits the first beam of the first wavelength $\lambda 1$, and the second light source 719 emits the second beam of the second wavelength $\lambda 2$ different from the first wavelength $\lambda 1$. Then, the first beam and the second beam are converged through the lens 711 or the like component for irradiation onto the optical storage medium 41. The first beam that has been reflected and diffracted on the optical storage medium 41 is detected by the first photodetector 717, which, in turn, outputs a signal commensurate with the amount of the first beam received thereon. The first signal processor 718 performs computation for the signal outputted from the first photodetector 717 to obtain the information recorded in the information storage layer 412 of the optical storage medium 41.

Also, the second beam that has been reflected and diffracted on the optical storage medium 41 is detected by the second photodetector 723, which, in turn, outputs a signal commensurate with the amount of the second beam received thereon. The second signal processor 724 performs computation for the signal outputted from the second photodetector 723, and generates a tracking control signal for controlling a tracking operation. The driver 725 performs the tracking operation in response to receiving the tracking control signal generated by the second signal processor 724.

On the other hand, the optical storage medium 41 has the reflection surface 202 for reflecting the first beam and the second beam, and the information storage layer 412 for recording information as an interference pattern by incidence of the first beam, and for reproducing information from a wave surface based on an interference pattern. The guide groove "G" usable in the tracking operation by irradiation of the second beam is formed in the reflection surface 202. There are partially formed in advance, on the information storage layer 412, the reference interference patterns, which are reproduced in irradiation of the first beam, and used as a reference for correcting the relative positional relation between the first beam and the second beam.

In response to receiving the signal from the first signal processor 718, which is generated in the irradiation of the first beam onto the reference interference patterns, the second signal processor 724 changes the tracking control signal so as to correct the tracking control position to an intended position.

With this arrangement, even if the first beam for information recording/reproduction, and the second beam for servo control are emitted from the different light sources, the tracking control position can be corrected to an intended position based on the information obtained from the reference interference patterns, which are used as the reference for correcting the relative positional relation between the first beam and the second beam. Also, the arrangement enables to keep the relative positional relation between the first beam and the second beam constant concerning the tracking control, thereby securing compatibility among different optical information apparatuses. Furthermore, since the arrangement is free from a drawback such as apparatus degradation resulting from aging deterioration, sufficient reliability is secured even in identical optical information apparatuses.

The second signal processor 724 performs computation in response to receiving the signal from the second photodetector 723, and generates a focusing control signal for controlling a focusing operation. The driver 725 performs the focusing operation upon receiving the focusing control signal generated by the second signal processor 724. The second signal processor 724 changes the focusing control signal to correct the focusing control position to an intended position upon receiving the signal from the first signal processor, which is generated in the irradiation of the first beam onto the reference interference patterns.

With this arrangement, even if the first beam for information recording/reproduction, and the second beam for servo control are emitted from the different light sources, the focusing control position can be corrected to an intended position based on the information obtained from the reference interference patterns, which are used as the reference for correcting the relative positional relation between the first beam and the second beam. Also, the arrangement enables to keep the relative positional relation between the first beam and the second beam constant concerning the focusing control, thereby securing compatibility among different optical information apparatuses.

Figure 5:
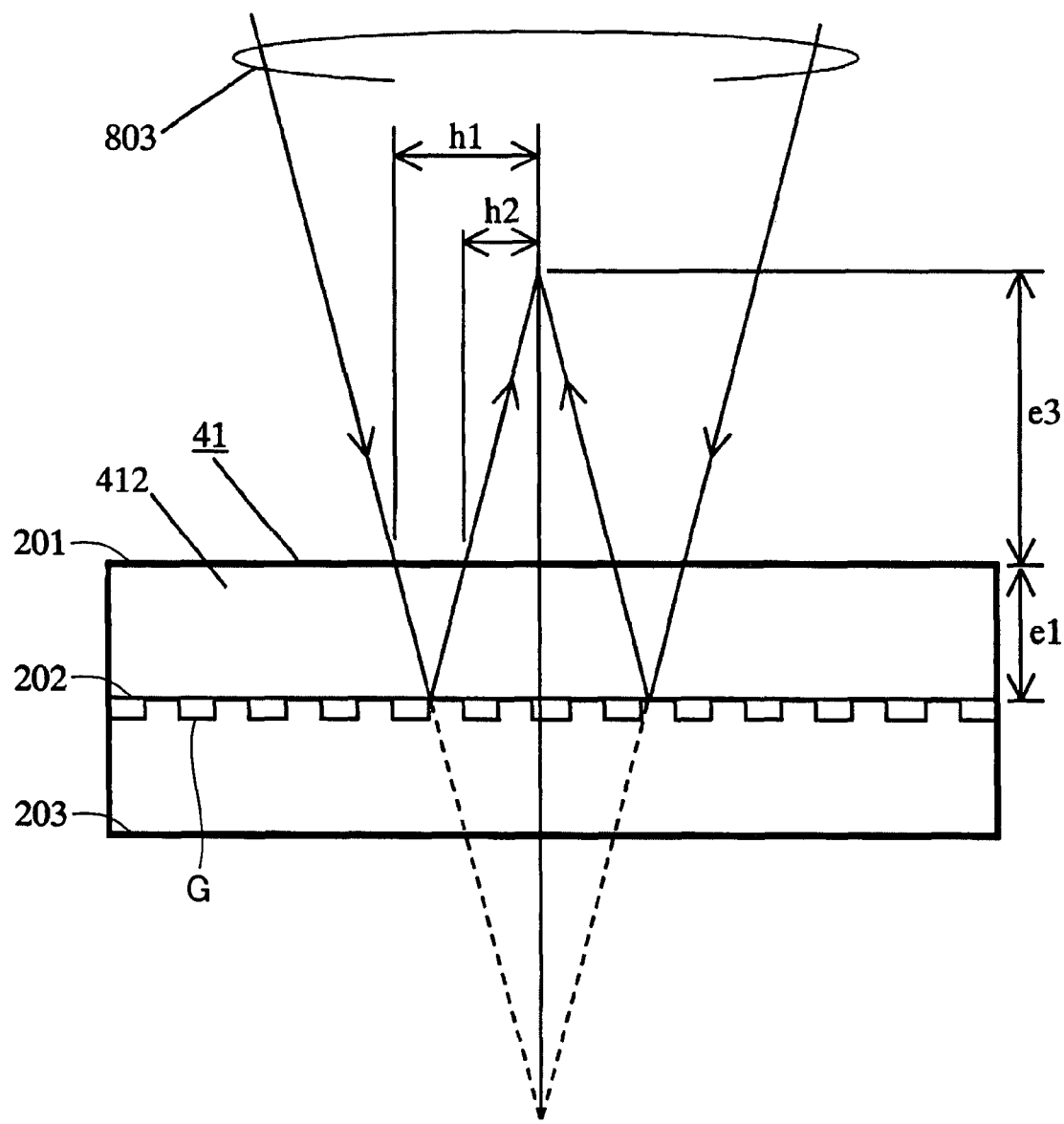
FIG. 5 is a diagram showing a relation between an optical storage medium, and a beam emitted from the optical information apparatus in the third embodiment of the invention.

FIG. 5 is a diagram showing a relation between the optical storage medium 41 and the beam 803 as reference light. The beam 803 has a smallest spot size at a rearward position relative to the surface 202 of the optical storage medium 41. Since the beam 803 is reflected on the surface 202, the beam 803 also has a smallest spot size at a forward position relative to the optical storage medium 41 i.e. on the side of the lens 711. Assuming that the optical thickness of the information storage layer 412 is "e1", and the distance from a surface 201 to the forward position relative to the optical storage medium 41 where the beam 803 has the smallest spot size is "e3", the optical information apparatus is designed in such a manner as to satisfy a relation: $e3 \geq 2 \cdot e1$. The spot size of the beam 803 is changed in the information storage layer 412 in a range from its maximal radius "h1" to its minimal radius "h2". However, irradiating the beam 803 so as to satisfy the relation: $e3 \geq 2 \cdot e1$ suppresses the change of the spot size of the beam 803 in the information storage layer 412 twice as large or smaller. The larger the change of the beam spot size in the information storage layer 412 is, the greater the recording condition is changed.

Idealistically, an influence resulting from the beam spot size difference is alleviated in multiplexing such as angular multiplexing or shift multiplexing by increasing the degree of multiplexing in an area where the beam spot size is large, and accordingly the light density is low, and by decreasing the degree of multiplexing in an area where the beam spot size is small, and accordingly, the light density is high. Actually, however, a non-linear recording characteristic regarding incident light due to a light absorption saturation characteristic of the material of the optical storage medium, and a change of the recording condition by an exothermic action may vary the recording conditions on the area where the beam spot size is small and the light density is high, and on the area where the beam spot size is large and the light density is low. As a result, scattering noise, degradation of diffraction efficiency, and the like may occur, which obstructs increasing the degree of multiplexing.

The information storage layer 412 is laminated on the reflection surface 202, and the beam 803 is incident from the side of the information storage layer 412. In a case that the position where the beam 803 reflected on the reflection surface 202 has the smallest spot size is located on the side of the lens 711 relative to the incident surface 201 of the information storage layer 412 where the beam 803 is incident, the relation: $e3 \geq 2 \cdot e1$ is satisfied where "e1" is the thickness of the information storage layer 412, and "e3" is the distance from the incident surface 201 of the information storage layer 412 where the beam 803 is incident to the position where the spot size of the beam 803 is the smallest.

Accordingly, controlling the first beam to be irradiated onto the information storage layer 412 in such a manner as to satisfy the relation $e3 \geq 2 \cdot e1$ where "e1" is the thickness of the information storage layer 412, and "e3" is the distance from the incident surface 201 of the information storage layer 412 where the beam 803 is incident to the position where the spot size of the beam 803 is the smallest enables to suppress the change of the spot size of the first beam in the information storage layer 412 twice as large or smaller.

Suppressing the change of the beam spot size in the information storage layer 412 twice as large or smaller enables to suppress local variation of the monomer consumption rate at the time of information recording in the information storage layer 412. Also, this arrangement enables to reduce a recording variation resulting from a behavior of the hologram that a nonlinear characteristic is observed regarding the incident light amount despite the merit that a recording operation proportional to the incident light amount is enabled in photon mode. Also, this arrangement enables to suppress an influence to a change of the recording condition resulting from a servo residual error, thereby securing stable information recording. Further, the arrangement enables to suppress scattering noise and lowering of diffraction efficiency, thereby providing an optical information apparatus with a high degree of multiplexing, in other words, of a large recording capacity. It should be noted that in the case where the information light and the reference light are converged at forward positions relative to the information storage layer 412, a similar effect as mentioned above is obtained. In this case, the beams 802 and 803 are irradiated in such a manner as to satisfy a relation: $e3 \geq 2e1$.

Fourth Embodiment

Figure 6:
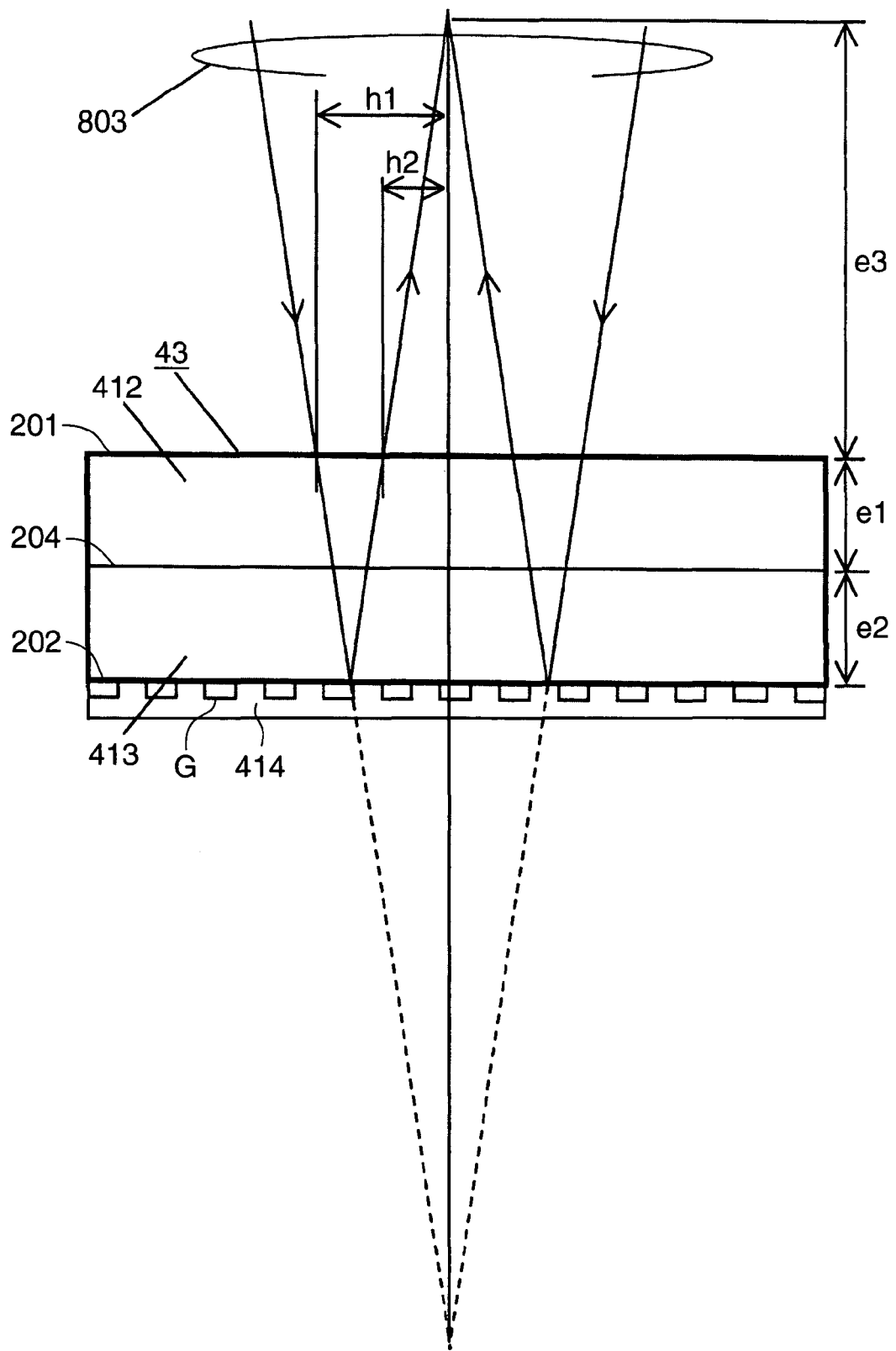
FIG. 6 is a diagram showing a relation between an optical storage medium, and a beam emitted from an optical information apparatus in a fourth embodiment of the invention.
Figure 7:
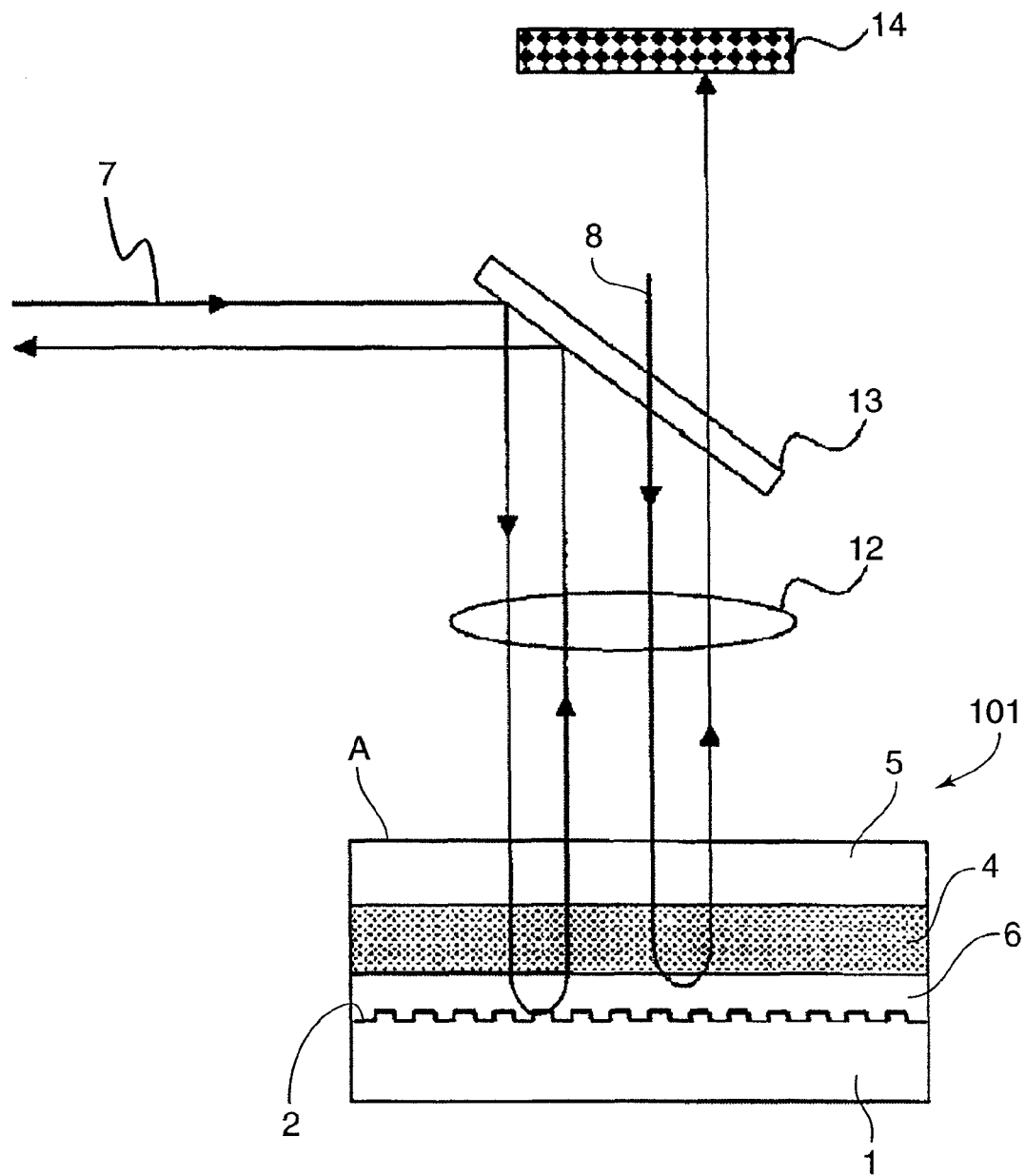
FIG. 7 is a diagram showing a relation between an optical storage medium, and a beam emitted from an optical information apparatus in the conventional art.

FIG. 6 is a diagram showing a relation between an optical storage medium 43 and a beam 803 as reference light in another embodiment of the invention. Although not illustrated, the basic arrangement of the optical storage medium 43 in the fourth embodiment is substantially the same as that of the optical storage medium 41 shown in the first embodiment.

The optical storage medium 41 shown in FIG. 5 and the optical storage medium 43 shown in FIG. 6 are different in the position of the surface 202. In the optical storage medium 43, the surface 202 including a reflection film having a groove is formed away from an information storage layer 412. Specifically, the optical storage medium 43 comprises the information storage layer 412, a base member 413, and a protective layer 414 which are laminated one over the other, and the surface 202 is formed between the base member 413 and the protective layer 414. The guide groove "G" is formed in the protective layer 414, and the reflection film is formed on the protective layer 414. The position where the beam 803 has a smallest spot size is located at a rearward position relative to the surface 202 of the optical storage medium 43. Since the beam 803 is reflected on the surface 202, the beam 803 also has a smallest spot size at a forward position relative to the optical storage medium 43 i.e, on the side of the lens 711.

Assuming that the optical thickness of the information storage layer 412 is "e1", the distance from a surface 201 to the forward position relative to the optical storage medium 43 where the beam 803 has the smallest spot size is "e3", and the optical distance from the surface 202 to a boundary surface 204 between the information storage layer 412 and the base member 413 is "e2", a relation: $e3 \geq 2 \cdot (e1+e2)$ is satisfied.

As mentioned above, the optical storage medium 43 comprises the base member 413 which is laminated between the reflection surface 202 and the information storage layer 412, and the beam 803 is incident from the side of the information storage layer 412. If the position where the beam 803 reflected on the reflection surface 202 has the smallest spot size is located on the side of the lens 711 relative to the incident surface 201 of the information storage layer 412 where the beam 803 is incident, the relation: $e3 \geq 2 \cdot (e1+e2)$ is satisfied where "e1" is the thickness of the information storage layer 412, "e2" is the thickness of the base member 412, and "e3" is the distance from the incident surface 201 of the information storage layer 412 where the beam 803 is incident to the position where the spot size of the beam 803 is the smallest.

Accordingly, controlling the beam 803 to be irradiated onto the information storage layer 412 in such a manner as to satisfy the relation: $e3 \geq 2 \cdot (e1+e2)$ where "e1" is the thickness of the information storage layer 412, "e2" is the thickness of the base member 413, and "e3" is the distance from the incident surface 201 of the information storage layer 412 where the beam 803 is incident to the position where the spot size of the beam 803 is the smallest enables to suppress the change of the spot size of the beam 803 in the information storage layer 412 twice as large or smaller. Similarly to the arrangement of the optical storage medium 41, stable information recording can be carried out by setting the change of the spot size of the beam in the information storage layer 412 twice as large or smaller.

The aforementioned embodiments essentially include the invention having the following arrangements.

An optical storage medium according to an aspect of the invention comprises a reflection surface for reflecting a first beam having a first wavelength, and reflecting a second beam having a second wavelength different from the first wavelength; and an information storage layer for recording information as an interference pattern by incidence of the first beam, or reproducing the information from a wave surface based on the interference pattern, wherein the reflection surface is formed with a plurality of marks or guide grooves usable in a tracking operation or a focusing operation by irradiation of the second beam; and the information storage layer is partially formed, in advance, with a reference interference pattern which is reproduced when the first beam is irradiated, and which is used as a reference for correcting a relative positional relation between the first beam and the second beam.

In the above arrangement, the reflection surface of the optical storage medium reflects the first beam having the first wavelength, and reflects the second beam having the second wavelength different from the first wavelength. The information storage layer of the optical storage medium records the information as the interference pattern by incidence of the first beam, or reproduces the information from the wave surface based on the interference pattern. The reflection surface is formed with the plurality of marks or guide grooves usable in the tracking operation or the focusing operation by irradiation of the second beam. The information storage layer is partially formed, in advance, with the reference interference pattern, which is reproduced when the first beam is irradiated, and which is used as the reference for correcting the relative positional relation between the first beam and the second beam.

With the above arrangement, even if the first beam for information recording/reproduction, and the second beam for servo control are emitted from the different light sources, the position for focusing control and the position for tracking control can be corrected to their respective intended positions based on the information obtained from the reference interference pattern used as the reference for correcting the relative positional relation between the first beam and the second beam. Also, the arrangement enables to keep the relative positional relation between the first beam and the second beam constant concerning the focusing control and the tracking control, thereby securing compatibility among different optical information apparatuses. Furthermore, since the arrangement is free from a drawback such as apparatus degradation resulting from aging deterioration, the arrangement enables to secure sufficient reliability even in identical optical information apparatuses.

Preferably, in the optical storage medium, the reference interference pattern may be formed on a predetermined site on the optical storage medium. With this arrangement, since the reference interference pattern is formed on the predetermined site on the optical storage medium, the information can be stored in an area other than the reference interference pattern, thereby enabling to increase the amount of information to be stored in the optical storage medium.

Preferably, in the optical storage medium, the reference interference pattern may be formed on a plurality of sites on the optical storage medium. With this arrangement, since the reference interference pattern is formed on the plurality of sites on the optical storage medium, error detection necessary for correcting the position for focusing control or the position for tracking control can be performed at the plural sites on the optical storage medium, thereby providing enhanced learning precision.

Preferably, in the optical storage medium, the optical storage medium may have a disk shape, and the reference interference pattern may be formed in plural number at substantially identical radial positions. In this arrangement, since the optical storage medium has the disk shape, and the reference interference pattern is formed in the plural number at the substantially identical radial positions, error detection necessary for correcting the position for focusing control or the position for tracking control can be sequentially performed. Further, this arrangement enables to shorten a learning time and to shorten a waiting time for users.

Preferably, in the optical storage medium, the optical storage medium may have a disk shape, and the reference interference pattern may be formed in plural number radially outwardly from a center of the disk-shaped optical storage medium. In this arrangement, since the optical storage medium has the disk shape, and the reference interference pattern is formed in the plural number radially outwardly from the center of the disk-shaped optical storage medium, the reference interference patterns are formed at intended radial positions. This enables to perform error detection necessary for correcting the position for focusing control or the position for tracking control at any one of the intended radial positions. Generally, the thickness, the warp, or the like of the information storage layer of the optical storage medium is greatly varied depending on the radial positions thereof. Performing the error detection necessary for correcting the position for focusing control or the position for tracking control at any one of the intended radial positions enables to enhance learning precision and to provide an optical storage medium with high reliability.

Preferably, in the optical storage medium, the optical storage medium may have a rectangular shape, the marks or the guide grooves may be formed substantially parallel to a side of the optical storage medium, and the reference interference pattern may be formed in plural number and substantially parallel to the marks or the guide grooves.

In the above arrangement, the optical storage medium has the rectangular shape, the marks or the guide grooves are formed substantially parallel to the side of the optical storage medium, and the reference interference pattern is formed in plural number and substantially parallel to the marks or the guide grooves. Generally, the thickness, the warp, or the like of the information storage layer of the rectangular optical storage medium is greatly varied in a direction parallel to the longer side or the shorter side of the optical storage medium. Performing the error detection necessary for correcting the position for focusing control or the position for tracking control at a position substantially parallel to the side of the rectangular optical storage medium enables to enhance learning precision and to provide an optical storage medium with high reliability.

Preferably, in the optical storage medium, the optical storage medium may have a rectangular shape, the marks or the guide grooves may be formed substantially parallel to a side of the optical storage medium, and the reference interference pattern may be formed in plural number and substantially perpendicular to the marks or the guide grooves.

In the above arrangement, the optical storage medium has the rectangular shape, the marks or the guide grooves are formed substantially parallel to the side of the optical storage medium, and the reference interference pattern is formed in plural number and substantially perpendicular to the marks or the guide grooves. Generally, the thickness, the warp, or the like of the information storage layer of the rectangular optical storage medium is greatly varied in a direction parallel to the longer side or the shorter side of the optical storage medium. Performing the error detection necessary for correcting the position for focusing control or the position for tracking control at a position substantially perpendicular to the side of the rectangular optical storage medium enables to enhance learning precision and to provide an optical storage medium with high reliability.

Preferably, in the optical storage medium, the reference interference pattern may be formed by a computer-synthesized hologram. In this arrangement, the reference interference pattern is formed by the computer-synthesized hologram. This enables to eliminate a recording error resulting from the performance of an apparatus for recording the reference interference pattern, and to enhance compatibility among different optical information apparatuses by physically forming the reference interference pattern, in place of optically forming the reference interference pattern.

An optical information apparatus according to another aspect of the invention comprises: a first light source for emitting a first beam having a first wavelength; a second light source for emitting a second beam having a second wavelength different from the first wavelength; a condensing optical system for converging the first beam and the second beam to irradiate the first beam and the second beam onto an optical storage medium; a first photodetector for receiving the first beam which is reflected and diffracted on the optical storage medium to output a signal commensurate with an amount of the first beam received thereon; a first signal processor for performing a computation in response to receiving the signal from the first photodetector to acquire information recorded in an information storage layer of the optical storage medium; a second photodetector for receiving the second beam which is reflected and diffracted on the optical storage medium to output a signal commensurate with an amount of the second beam received thereon; a second signal processor for performing a computation in response to receiving the signal from the second photodetector to generate a tracking control signal; and a driver for performing a tracking operation in response to receiving the tracking control signal generated by the second signal processor. The optical storage medium comprises: a reflection surface for reflecting the first beam, and reflecting the second beam; and the information storage layer for recording information as an interference pattern by incidence of the first beam, or reproducing the information from a wave surface based on the interference pattern. The reflection surface is formed with a plurality of marks or guide grooves usable in the tracking operation by irradiation of the second beam. The information storage layer is partially formed, in advance, with a reference interference pattern which is reproduced when the first beam is irradiated, and which is used as a reference for correcting a relative positional relation between the first beam and the second beam. The second signal processor changes the tracking control signal so as to correct a position for tracking control to an intended position in response to receiving a signal from the first signal processor when the first beam is irradiated onto the reference interference pattern.

In the above arrangement, the first light source emits the first beam having the first wavelength, and the second light source emits the second beam having the second wavelength different from the first wavelength. The condensing optical system converges the first beam and the second beam to irradiate the first beam and the second beam onto the optical storage medium. The first photodetector receives the first beam which is reflected and diffracted on the optical storage medium to output the signal commensurate with the amount of the first beam received thereon. The first signal processor performs the computation in response to receiving the signal from the first photodetector to acquire the information recorded in the information storage layer of the optical storage medium. The second photodetector receives the second beam which is reflected and diffracted on the optical storage medium to output the signal commensurate with the amount of the second beam received thereon. The second signal processor performs the computation in response to receiving the signal from the second photodetector to generate the tracking control signal. The driver performs the tracking operation in response to receiving the tracking control signal generated by the second signal processor. The optical storage medium comprises: the reflection surface for reflecting the first beam, and reflecting the second beam; and the information storage layer for recording the information as the interference pattern by incidence of the first beam, or reproducing the information from the wave surface based on the interference pattern. The reflection surface is formed with the plurality of marks or guide grooves usable in the tracking operation by irradiation of the second beam. The information storage layer is partially formed, in advance, with the reference interference pattern which is reproduced when the first beam is irradiated, and which is used as the reference for correcting the relative positional relation between the first beam and the second beam. The second signal processor changes the tracking control signal so as to correct the position for tracking control to the intended position in response to receiving the signal from the first signal processor when the first beam is irradiated onto the reference interference pattern.

With the above arrangement, even if the first beam for information recording/reproduction, and the second beam for servo control are emitted from the different light sources, the position for tracking control can be corrected to the intended position based on the information obtained from the reference interference pattern used as the reference for correcting the relative positional relation between the first beam and the second beam. Also, the arrangement enables to keep the relative positional relation between the first beam and the second beam constant concerning the tracking control, thereby securing compatibility among different optical information apparatuses. Furthermore, since the arrangement is free from a drawback such as apparatus degradation resulting from aging deterioration, the arrangement enables to secure sufficient reliability even in identical optical information apparatuses.

Preferably, in the optical information apparatus, the second signal processor may generate a focusing control signal by performing a computation in response to receiving the signal from the second photodetector, the driver may perform a focusing operation in response to receiving the focusing control signal generated by the second signal processor, and the second signal processor may change the focusing control signal so as to correct a position for focusing control to an intended position in response to receiving a signal from the first signal processor which is generated when the first beam is irradiated onto the reference interference pattern.

In the above arrangement, the second signal processor generates the focusing control signal by performing the computation in response to receiving the signal from the second photodetector, the driver performs the focusing operation in response to receiving the focusing control signal generated by the second signal processor, and the second signal processor changes the focusing control signal so as to correct the position for focusing control to the intended position in response to receiving the signal from the first signal processor which is generated when the first beam is irradiated onto the reference interference pattern.

With the above arrangement, even if the first beam for information recording/reproduction, and the second beam for servo control are emitted from the different light sources, the position for focusing control can be corrected to the intended position based on the information obtained from the reference interference pattern used as the reference for correcting the relative positional relation between the first beam and the second beam. Also, the arrangement enables to keep the relative positional relation between the first beam and the second beam constant concerning the focusing control, thereby securing compatibility among different optical information apparatuses.

Preferably, in the optical information apparatus, the optical storage medium may further comprise a base member which is laminated between the reflection surface and the information storage layer, the first beam being incident from a side of the information storage layer, and in a case that a position where a spot size of the first beam reflected on the reflection surface is smallest is located on a side of the condensing optical system relative to a surface of the information storage layer where the first beam is incident, the optical information apparatus may satisfy a relation: $e3 \geq 2 \cdot (e1+e2)$ where "e1" represents a thickness of the information storage layer, "e2" represents a thickness of the base member, and "e3" represents a distance from the incident surface of the information storage layer to the position where the spot size of the first beam is the smallest.

In the above arrangement, the optical storage medium further comprises the base member which is laminated between the reflection surface and the information storage layer, and the first beam is incident from the side of the information storage layer. In the case that the position where the spot size of the first beam reflected on the reflection surface is the smallest is located on the side of the condensing optical system relative to the incident surface of the information storage layer where the first beam is incident, the optical information apparatus satisfies the relation: $e3 \geq 2 \cdot (e1+e2)$ where "e1" represents the thickness of the information storage layer, "e2" represents the thickness of the base member, and "e3" represents the distance from the incident surface of the information storage layer to the position where the spot size of the first beam is the smallest.

With the above arrangement, irradiating the first beam in such a manner as to satisfy the relation: $e3 \geq 2 \cdot (e1+e2)$ where "e1" represents the thickness of the information storage layer, "e2" represents the thickness of the base member, and "e3" represents the distance from the incident surface of the information storage layer to the position where the spot size of the first beam is the smallest enables to suppress a change of the spot size of the first beam in the information storage layer twice as large or smaller. Suppressing the change of the spot size of the first beam in the information storage layer twice as large or smaller enables to suppress a local variation of the monomer consumption rate at the time of information recording in the information storage layer.

Preferably, in the optical information apparatus, the information storage layer may be laminated on the reflection surface, the first beam being incident from a side of the information storage layer, and in a case that a position where a spot size of the first beam reflected on the reflection surface is smallest is located on a side of the condensing optical system relative to a surface of the information storage layer where the first beam is incident, the optical information apparatus may satisfy a relation: $e3 \geq 2 \cdot e1$ where "e1" represents a thickness of the information storage layer, and "e3" represents a distance from the incident surface of the information storage layer to the position where the spot size of the first beam is the smallest.

In the above arrangement, the information storage layer is laminated on the reflection surface, and the first beam is incident from the side of the information storage layer. In the case that the position where the spot size of the first beam reflected on the reflection surface is the smallest is located on the side of the condensing optical system relative to the incident surface of the information storage layer where the first beam is incident, the optical information apparatus satisfies the relation: $e3 \geq 2 \cdot e1$ where "e1" represents the thickness of the information storage layer, and "e3" represents the distance from the incident surface of the information storage layer to the position where the spot size of the first beam is the smallest.

With the above arrangement, irradiating the first beam in such a manner as to satisfy the relation: $e3 \geq 2 \cdot e1$ where "e1" represents the thickness of the information storage layer, and "e3" represents the distance from the incident surface of the information storage layer to the position where the spot size of the first beam is the smallest enables to suppress a change of the spot size of the first beam in the information storage layer twice as large or smaller. Suppressing the change of the spot size of the first beam in the information storage layer twice as large or smaller enables to suppress a local variation of the monomer consumption rate at the time of information recording in the information storage layer.

EXPLOITATION IN INDUSTRY

The optical storage medium and the optical information apparatus of the invention enable to keep the relative positional relation between a beam for servo control and a beam for information recording/reproduction constant concerning focusing control and tracking control, even if the two beams are different from each other. Thus, the invention is useful as an optical storage medium designed such that information is recorded using an interference pattern, an optical information apparatus for recording, reproducing, or erasing information, and the like.

The invention claimed is:

1. An optical storage medium comprising:
    a reflection surface for reflecting a first beam having a first wavelength, and reflecting a second beam having a second wavelength different from the first wavelength; and
    an information storage layer for recording information as an interference pattern by incidence of the first beam, or reproducing the information from a wave surface based on the interference pattern, wherein
    the reflection surface is formed with a plurality of marks or guide grooves usable in a tracking operation or a focusing operation by irradiation of the second beam; and
    the information storage layer is partially formed, in advance, with a reference interference pattern which is reproduced when the first beam is irradiated, and which is used as a reference for correcting a relative positional relation between the first beam and the second beam.

2. The optical storage medium according to claim 1, wherein
    the reference interference pattern is formed on a predetermined site on the optical storage medium.

3. The optical storage medium according to claim 1, wherein
    the reference interference pattern is formed on a plurality of sites on the optical storage medium.

4. The optical storage medium according to claim 1, wherein
    the optical storage medium has a disk shape, and
    the reference interference pattern is formed in plural number at substantially identical radial positions.

5. The optical storage medium according to claim 1, wherein
    the optical storage medium has a disk shape, and
    the reference interference pattern is formed in plural number radially outwardly from a center of the disk-shaped optical storage medium.

6. The optical storage medium according to claim 1, wherein
    the optical storage medium has a rectangular shape,
    the marks or the guide grooves are formed substantially parallel to a side of the optical storage medium, and
    the reference interference pattern is formed in plural number and substantially parallel to the marks or the guide grooves.

7. The optical storage medium according to claim 1, wherein
    the optical storage medium has a rectangular shape,
        the marks or the guide grooves are formed substantially parallel to a side of the optical storage medium, and
    the reference interference pattern is formed in plural number and substantially perpendicular to the marks or the guide grooves.

8. The optical storage medium according to claim 1, wherein
    the reference interference pattern is formed by a computer-synthesized hologram.

9. An optical information apparatus comprising:
    a first light source for emitting a first beam having a first wavelength;
    a second light source for emitting a second beam having a second wavelength different from the first wavelength;
    a condensing optical system for converging the first beam and the second beam to irradiate the first beam and the second beam onto an optical storage medium;
    a first photodetector for receiving the first beam which is reflected and diffracted on the optical storage medium to output a signal commensurate with an amount of the first beam received thereon;
    a first signal processor for performing a computation in response to receiving the signal from the first photodetector to acquire information recorded in an information storage layer of the optical storage medium;
    a second photodetector for receiving the second beam which is reflected and diffracted on the optical storage medium to output a signal commensurate with an amount of the second beam received thereon;
    a second signal processor for performing a computation in response to receiving the signal from the second photodetector to generate a tracking control signal; and
    a driver for performing a tracking operation in response to receiving the tracking control signal generated by the second signal processor, wherein
    the optical storage medium comprises:
        a reflection surface for reflecting the first beam, and reflecting the second beam; and
        the information storage layer for recording information as an interference pattern by incidence of the first beam, or reproducing the information from a wave surface based on the interference pattern, the reflection surface being formed with a plurality of marks or guide grooves usable in the tracking operation by irradiation of the second beam, and the information storage layer being partially formed, in advance, with a reference interference pattern which is reproduced when the first beam is irradiated, and which is used as a reference for correcting a relative positional relation between the first beam and the second beam, and the second signal processor changes the tracking control signal so as to correct a position for tracking control to an intended position in response to receiving a signal from the first signal processor when the first beam is irradiated onto the reference interference pattern.

10. The optical information apparatus according to claim 9, wherein the second signal processor generates a focusing control signal by performing a computation in response to receiving the signal from the second photodetector, the driver performs a focusing operation in response to receiving the focusing control signal generated by the second signal processor, and the second signal processor changes the focusing control signal so as to correct a position for focusing control to an intended position in response to receiving a signal from the first signal processor which is generated when the first beam is irradiated onto the reference interference pattern.

11. The optical information apparatus according to claim 9, wherein the optical storage medium further comprises a base member which is laminated between the reflection surface and the information storage layer, the first beam being incident from a side of the information storage layer, and in a case that a position where a spot size of the first beam reflected on the reflection surface is smallest is located on a side of the condensing optical system relative to a surface of the information storage layer where the first beam is incident, the optical information apparatus satisfies a relation:

$$e3 \geq 2 \cdot (e1 + e2)$$

where "e1" represents a thickness of the information storage layer, "e2" represents a thickness of the base member, and "e3" represents a distance from the incident surface of the information storage layer to the position where the spot size of the first beam is the smallest.

12. The optical information apparatus according to claim 9, wherein the information storage layer is laminated on the reflection surface, the first beam being incident from a side of the information storage layer, and in a case that a position where a spot size of the first beam reflected on the reflection surface is smallest is located on a side of the condensing optical system relative to a surface of the information storage layer where the first beam is incident, the optical information apparatus satisfies a relation:

$$e3 > 2 \cdot e1$$

where "e1" represents a thickness of the information storage layer, and "e3" represents a distance from the incident surface of the information storage layer to the position where the spot size of the first beam is the smallest.

* * * * *